US008391615B2

(12) United States Patent
Wu et al.

(10) Patent No.: US 8,391,615 B2
(45) Date of Patent: Mar. 5, 2013

(54) IMAGE RECOGNITION ALGORITHM, METHOD OF IDENTIFYING A TARGET IMAGE USING SAME, AND METHOD OF SELECTING DATA FOR TRANSMISSION TO A PORTABLE ELECTRONIC DEVICE

(75) Inventors: Yi Wu, San Jose, CA (US); Horst Haussecker, Palo Alto, CA (US); Igor Kozintsev, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1047 days.

(21) Appl. No.: 12/315,405

(22) Filed: Dec. 2, 2008

(65) Prior Publication Data

US 2010/0135527 A1    Jun. 3, 2010

(51) Int. Cl.
*G06K 9/46* (2006.01)
*G06K 7/00* (2006.01)
*G10L 15/04* (2006.01)

(52) U.S. Cl. ......... 382/218; 382/190; 382/312; 704/251

(58) Field of Classification Search .................. 382/218, 382/103, 190, 199, 276, 305, 312; 704/231, 704/251; 707/705
See application file for complete search history.

(56) References Cited

U.S. PATENT DOCUMENTS

| 6,941,321 | B2 * | 9/2005 | Schuetze et al. ........................ 1/1 |
| 7,697,792 | B2 * | 4/2010 | Keating et al. ................. 382/305 |
| 7,809,722 | B2 * | 10/2010 | Gokturk et al. ................ 707/736 |
| 7,860,317 | B2 * | 12/2010 | Xie et al. ....................... 382/195 |
| 7,884,847 | B2 * | 2/2011 | Kojima et al. .................. 348/22 |
| 7,966,327 | B2 * | 6/2011 | Li et al. ........................... 707/737 |
| 2006/0101060 | A1 | 5/2006 | Li et al. |

FOREIGN PATENT DOCUMENTS

| JP | 06-274547 A | 9/1994 |
| JP | 08-255223 A | 10/1996 |
| JP | 2002-007413 A | 1/2002 |
| JP | 2005-182350 A | 7/2005 |

(Continued)

OTHER PUBLICATIONS

Joo-Hwee Lim, Jean-Pierre Chevallet and Sihem Nouarah Merah, "SnapToTell: Ubiquitous Information Access from Cameras." Mobile & Ubiquitous Information Access (MUIA'04) Workshop as part of the conference Mobile Human Computer Interaction with Mobile Devices and Services (Mobile HCI 04), Sep. 2004, 7 pgs.

(Continued)

*Primary Examiner* — Sheela Chawan
(74) *Attorney, Agent, or Firm* — Kenneth A. Nelson

(57) ABSTRACT

An image recognition algorithm includes a keypoints-based comparison and a region-based color comparison. A method of identifying a target image using the algorithm includes: receiving an input at a processing device, the input including data related to the target image; performing a retrieving step including retrieving an image from an image database, and, until the image is either accepted or rejected, designating the image as a candidate image; performing an image recognition step including using the processing device to perform an image recognition algorithm on the target and candidate images in order to obtain an image recognition algorithm output; and performing a comparison step including: if the image recognition algorithm output is within a pre-selected range, accepting the candidate image as the target image; and if the image recognition algorithm output is not within the pre-selected range, rejecting the candidate image and repeating the retrieving, image recognition, and comparison steps.

10 Claims, 6 Drawing Sheets

FOREIGN PATENT DOCUMENTS

| | | |
|---|---|---|
| JP | 2005-234994 A | 9/2005 |
| JP | 2006-099522 A | 4/2006 |
| JP | 2007-316950 A | 12/2007 |
| JP | 2008-146510 A | 6/2008 |
| WO | 2008/059422 A1 | 5/2008 |

OTHER PUBLICATIONS

Tobias H. Höllerer and Steven K. Feiner. "Mobile Augmented Reality." Telegeoinformatics: Location-Based Computing and Services. H Karimi and A. Hammad (eds.). Taylor & Francis Books Ltd., Jan. 2004, 39 pgs.

David G. Lowe, "Distinctive image features from scale-invariant keypoints," International Journal of Computer Vision, 60, 2 (2004), pp. 91-110.

Feng Jing, Mingjing Li, Hong-Jiang Zhang, Bo Zhang. "An Efficient and Effective Region-Based Image Retrieval Framework." IEEE Transactions on Image Processing, vol. 13, No. 5, May 2004, pp. 699-709.

Edward Y. Chang, "EXTENT: fusing context, content, and semantic ontology for photo annotation." Proceedings of the 2nd international workshop on Computer vision meets databases, 2005, 7 pgs.

Hirotaka Sonobe, Saeko Takagi and Fujiichi Yoshimoto, "Mobile Computing System for Fish Image Retrieval." International Workshop on Advanced Image Technology (IWAIT2004), 6 pgs.

J. Huang, S. Kumar, M. Mitra, W.-J. Zhu, and R. Zabih, "Image indexing using color correlograms," in IEEE Comput. Soc. Conf. Comput. Vision Pattern Recognition, Puerto Rico, Jun. 1997, pp. 762-768.

Yossi Rubner, Carlo Tomasi, Leonidas J. Guibas: "A Metric for Distributions with Applications to Image Databases". Proceedings ICCV 1998: 59-66.

Herbert Bay, Tinne Tuytelaars, Luc Van Gool, "SURF: Speeded Up Robust Features", Proceedings of the ninth European Conference on Computer Vision, May 2006, 14 pgs.

Office Action received for Japanese Patent Application No. P2009-271250, Sep. 5, 2011, 4 pages of Japanese office action and 3 pages of English translation.

Susuki, Mitsutaka, "Virtual Reality 4," "Extrinsic Camera Parameter Estimation from a Still Image Based on Feature Landmark Database," Transactions of the Virtual Reality Society of Japan, vol. 13, Nonprofit Organization, The Virtual Reality Society of Japan, No. 2 Jun. 30, 2008, pp. 161-170. (Only Abstract in English).

Murabayashi, Noboru, "Performance Improvement of Similar Image Retrieval by the Image Grouping," The 70th (2008) National Convention, Architecture Software Science Technology Database and Media, Information Processing Society of Japan, Mar. 13, 2008, pp. 1-389-1-390.

Ryu, Ounan, "Mass-image Recognition by Integration of Multi-features," The 70th (2008) National Convention, Architecture Software Science Technology Database and Media, Information Processing Society of Japan, Mar. 13, 2008, pp. 1-545-1-546.

Office Action Received for Chinese Patent Application No. 200911000228.6, mailed on Mar. 21, 2012, 6 Pages of Chinese Office Action and 7 Pages of English Translation.

Office Action Received for Chinese Patent Application No. 200911000228.6, mailed on Sep. 21, 2012, 7 Pages of Chinese Office Action and 10 Pages of English Translation.

Office Action Received for Japanese Divisional Patent Application No. 2012-048628, mailed on Oct. 25, 2012, 3 Pages of Japanese Office Action and 2 Pages of English Translation.

* cited by examiner

IMAGE RECOGNITION ALGORITHM, METHOD OF IDENTIFYING A TARGET IMAGE USING SAME, AND METHOD OF SELECTING DATA FOR TRANSMISSION TO A PORTABLE ELECTRONIC DEVICE

FIELD OF THE INVENTION

The disclosed embodiments of the invention relate generally to image recognition, and relate more particularly to constraint-based image recognition techniques for mobile augmented reality.

BACKGROUND OF THE INVENTION

Mobile Internet Devices (MIDs) represent a fast-growing global market. These mobile computing devices are characterized by small size, widely-available Internet connectivity, and robust computational power. These features enable mobile augmented reality applications that enhance a person's perception and experience by offering added, contextual information based on parameters such as the person's location and the objects in view of the MID's integrated camera. A key technology enabling this usage model is finding and matching objects in images and video based on contextual information (such as location and direction).

BRIEF DESCRIPTION OF THE DRAWINGS

The disclosed embodiments will be better understood from a reading of the following detailed description, taken in conjunction with the accompanying figures in the drawings in which.

Figure 1:
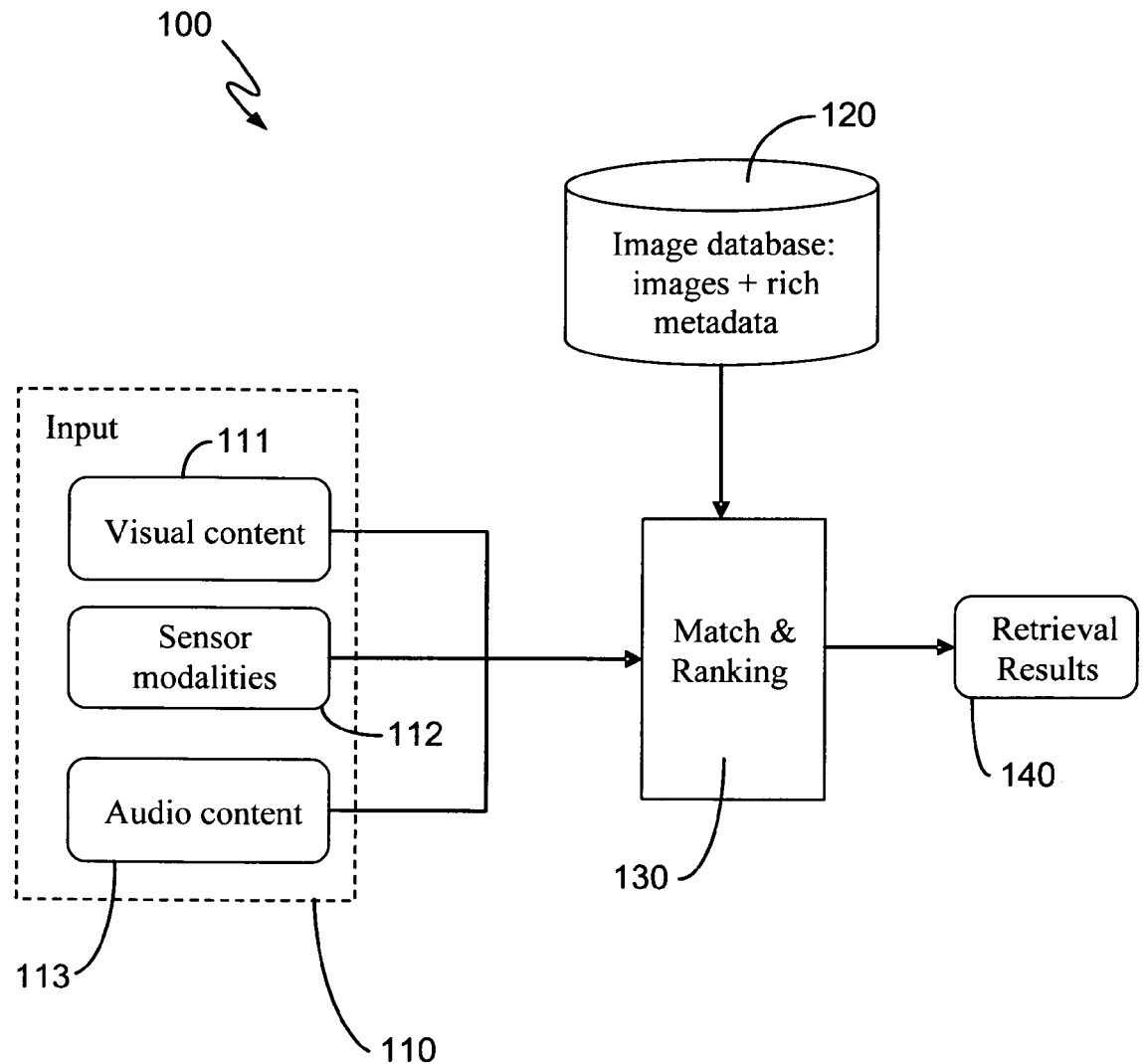
FIG. 1 is a schematic representation of a constraint-based image recognition system flow according to an embodiment of the invention.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

DETAILED DESCRIPTION OF THE DRAWINGS

In one embodiment of the invention, an image recognition algorithm comprises a keypoints-based comparison and a region-based color comparison. The algorithm may further comprise a visual symbol comparison. In one embodiment of the invention, a method of identifying a target image using the image recognition algorithm comprises: receiving an input at a processing device, the input including data related to the target image; performing a retrieving step comprising retrieving an image from an image database, and, until the image is either accepted or rejected, designating the image as a candidate image; performing an image recognition step comprising using the processing device to perform an image recognition algorithm on the target image and the candidate image in order to obtain an image recognition algorithm output; and performing a comparison step comprising: if the image recognition algorithm output is within a pre-selected range, accepting the candidate image as the target image; and if the image recognition algorithm output is not within the pre-selected range, rejecting the candidate image and repeating the retrieving step, the image recognition step, and the comparison step.

Accordingly, embodiments of the invention enable constraint-based image recognition for mobile augmented reality. A user interested in knowing more about a place or an object may capture images of the place or object with a MID or other mobile device and receive relevant information about the captured place or object, possibly in the form of augmented information overlaid on the captured image on the mobile device. In certain embodiments, users may select regions of interest for query by implementing an automatic region segmentation algorithm embedded on the MID or other device. In such algorithms, users can easily select regions of interest by touching automatically generated region segments on a touch screen that is segmented into pre-selected regions rather than by using drawing tools.

Real-time response and good information retrieval accuracy are two critical components for mobile device applications. However, for most image recognition algorithms, as the size of image database grows both the speed and accuracy of matching decrease. Furthermore, image recognition based on visual content alone has proved to be very challenging because current computer vision and pattern recognition techniques have not been able to perfectly identify images captured under different lighting conditions, viewing perspectives, rotations, resolutions, and occlusions.

Embodiments of the invention utilize sensor modalities such as location system data, 3D accelerometer data, and gyroscope and digital compass information to reduce image search complexity. Location system data can include data from a global positioning system (GPS), a wide area network (WAN), a wireless network, and the like. For example, if the query image's GPS location is near "350 Fifth Avenue, between 33rd and 34th Streets, in midtown Manhattan in New York City" (the address of the Empire State Building), the query image need not be compared with images at significantly different GPS locations. Thus, for example, the query image would not be confused with images of Chicago's Sears Tower or Frankfurt's Commerzbank Tower (both of which, along with many other skyscrapers, look at least somewhat similar to the Empire State Building).

Furthermore, embodiments of the invention complement image recognition with text and logos appearing in the scene and with speech keywords from user inputs using optical character recognition (OCR) and speech recognition techniques. Text-based retrieval has the advantages of low computational cost, low storage requirements, and low transmission bandwidth. These text-based inputs help the search system zoom into a reduced search space in real time. Text information is also helpful for differentiating objects with similar appearances. As mentioned above, certain embodiments also employ an advanced image recognition algorithm that combines region-based color comparison and keypoints-based comparison. The combination of matching results of both visual feature spaces takes the benefits from both features and provides a robust image recognition system to deal with different lighting conditions, viewing perspectives, rotations, and so forth.

Referring now to the drawings, FIG. 1 is a schematic representation of a constraint-based image recognition system flow 100 according to an embodiment of the invention. As illustrated in FIG. 1, system flow 100 takes an input 110, which, as illustrated, comprises visual content 111, sensor modalities 112, and audio content 113, and, together with information retrieved from an image database 120, performs a match and ranking procedure 130 in order to arrive at retrieval results 140. System flow 100 will be discussed below in greater detail.

Figure 2:
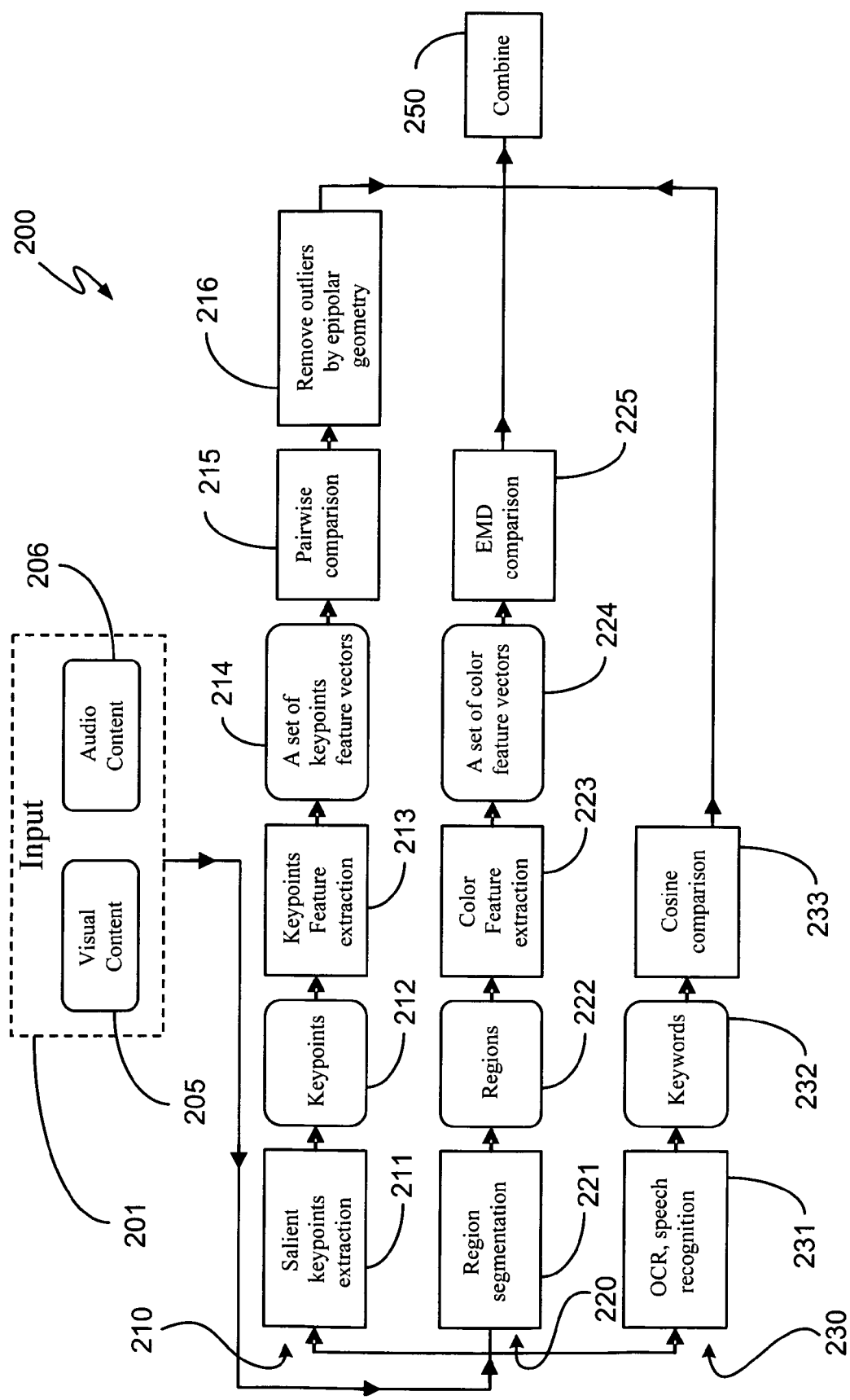
FIGS. 2 and 3 are schematic representations of an image recognition algorithm according to embodiments of the invention.

FIG. 2 is a schematic representation of an image recognition algorithm 200 according to an embodiment of the invention. As illustrated in FIG. 2, image recognition algorithm 200 comprises a keypoints-based comparison 210 and a region-based color comparison 220.

Keypoints-based comparisons are invariant to image scale and image rotation and are partially invariant to changes in viewpoint and illumination. Multiple images of the same object are thus less likely to be falsely identified as non-matches when the images have been processed using keypoints-based comparison techniques, even where those images were taken under different lighting conditions, from different angles and distances, etc. As an example, keypoints-based comparison 210 can comprise a salient keypoints extraction procedure 211 resulting in the identification of keypoints 212. Keypoints feature extraction 213 produces a set of keypoints feature vectors 214. These may be processed using a pairwise comparison 215, described in more detail below. The comparison may be improved by utilizing epipolar geometry constraints 216 or other projective geometry techniques as known in the art in order to remove keypoint matching outliers and to enforce the geometric co-location of feature points representing a particular object of interest.

Pairwise comparison 215, according to one embodiment, involves a direct comparison of two images using the keypoints from each image. For example, if Image 1 has Keypoints A and B, and Image 2 has Keypoints C and D then pairwise comparison 215 comprises building a bi-partite graph including distances A-C, A-D, B-C, B-D. The distances are ranked and the smallest distance is determined, after which the next smallest distance not involving either point from the smallest distance is identified. Using the small sample size of the foregoing example, once A-C is identified as the smallest distance then B-D is left as the only remaining distance that does not include either A or C. Distances A-C and B-D are then added together in order to obtain a sum. If this sum is "small," i.e., within a certain pre-selected range, then Image 1 and Image 2 can be identified as being images of the same object. This pre-selected range is application-dependent and may be adjusted up or down in order to identify matching images in greater or lesser numbers, as desired.

Pairwise comparison 215 has the advantage of being symmetric. Other comparisons may not be symmetric—i.e., may depend on which image is identified as the first image—including those that compare each keypoint of an image to the keypoints of multiple images (rather than to one image at a time) from a database in an attempt to find a closest match.

Region-based color comparison is a robust comparison strategy because a region of pixels is more stable with respect to noise and distortions than a single pixel and more precise than whole images containing multiple objects. In various embodiments, region-based color comparison 220 can involve the use of color correlograms, color red-green-blue (RGB) histograms, or other suitable color-related features. As an example, region-based color comparison 220 can comprise a region segmentation procedure 221 resulting in the identification of regions 222. Color feature extraction 223 produces a set of color feature vectors 224 that may be processed using an earth mover's distance (EMD) comparison 225 as known in the art.

As further illustrated in FIG. 2, image recognition algorithm 200 can further comprise a visual symbol comparison 230. As an example, visual symbol comparison 230 can compare text, logos, alphanumeric characters, and other characters and symbols that appear on or in connection with an object in an image. As another example, visual symbol comparison 230 may make use of techniques 231 such as OCR and speech recognition in order to arrive at keywords 232. These may be compared with a cosine comparison 233 according to techniques that are known in the art. Visual symbol comparison 230, keypoints-based comparison 210, and region-based color comparison 220 may be combined 250 in a process analogous to match and ranking procedure 130 in order to arrive at retrieval results 140 (see FIG. 1).

Image recognition algorithm 200 may operate on an input 201, which in the illustrated embodiment comprises a visual content 205 and an audio content 206. As an example, keypoints-based comparison 210, region-based color comparison 220, and visual symbol comparison 230 can take their inputs from visual content 205. As another example, audio content 206 may comprise spoken commands, audible descriptions of an image's contents, or the like. Image recognition algorithm 200 may further comprise an analysis of audio content 206. Traditional speech recognition techniques may be used in order to obtain keywords from audio content 206.

Figure 3:
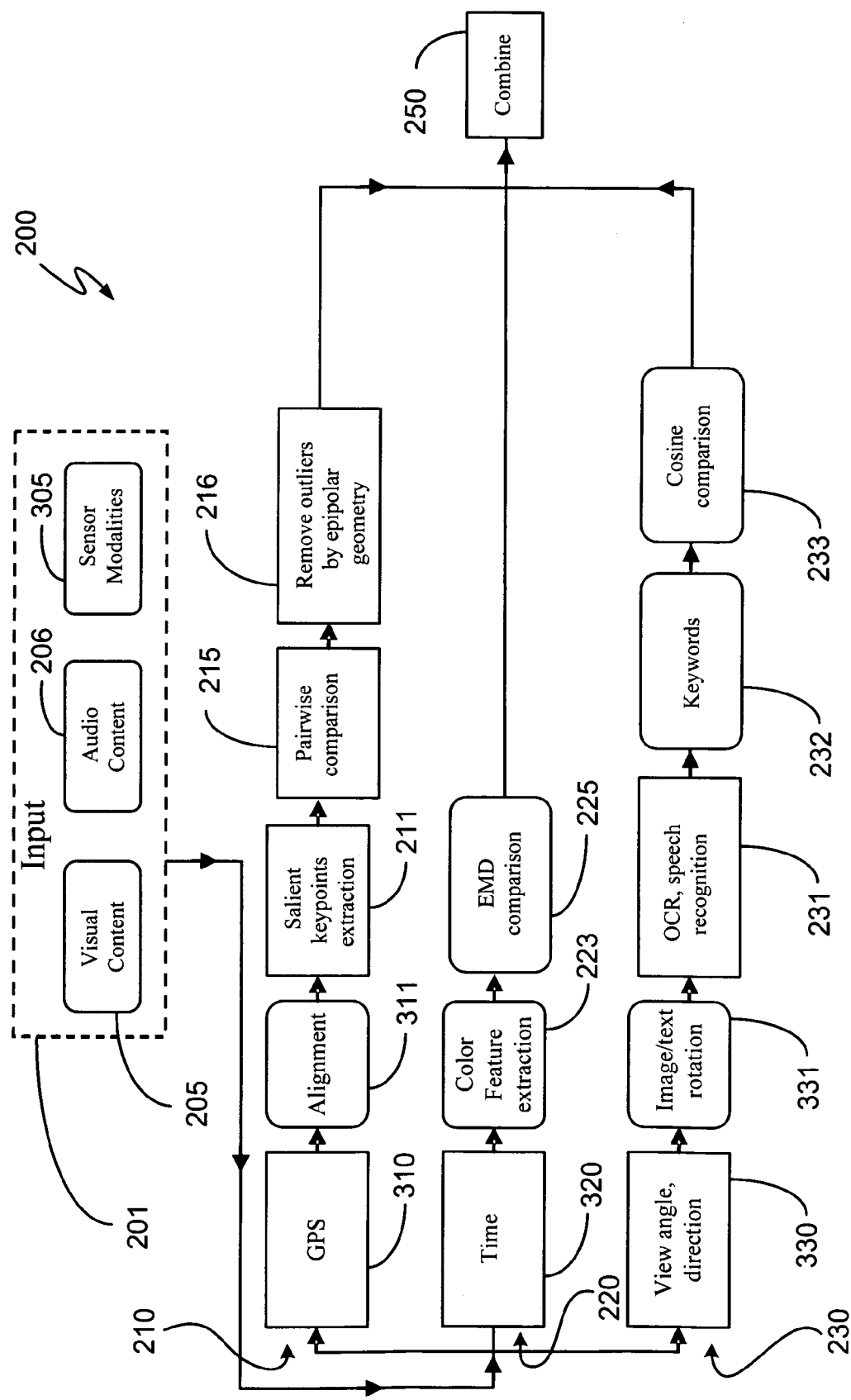

In one embodiment, image recognition algorithm 200 further comprises a sensor modalities analysis. This is illustrated in FIG. 3, which is a schematic representation of image recognition algorithm 200 according to an embodiment of the invention. For simplicity, certain elements of image recognition algorithm 200 that appear in FIG. 2 are omitted from FIG. 3.

As illustrated in FIG. 3, input 201 of image recognition algorithm 200 can further comprise sensor modalities 305. These may include GPS data 310 or other suitable location sensor data, alignment information 311, time 320, view angle and direction data 330, and the like. Thus, one embodiment combines image content (e.g., visual content 205 and audio content 206) with sensor modalities (305) to improve image recognition accuracy and efficiency. For example, given a GPS location, view angle, direction, etc. two images of the same object taken from different viewing angles and directions can be aligned, using view angle and direction data 330, before keypoints extraction. By doing that, identical objects captured at different rotations 331, view perspectives, etc. can be matched more accurately. As another example, if the capture time (320) shows that one image was taken during the daytime and the other was taken during the evening hours, color comparison will not be used at all, in order to reduce matching errors that could otherwise arise as a result of the large color changes brought on by day/evening and day/night lighting differences. In addition, OCR accuracy requires that text be located in horizontal position. With the aid of sensor information 330 such as view angle, direction, etc., images can be rotated, if necessary, to a horizontal position in order to increase the accuracy of OCR process (231).

Figure 4:
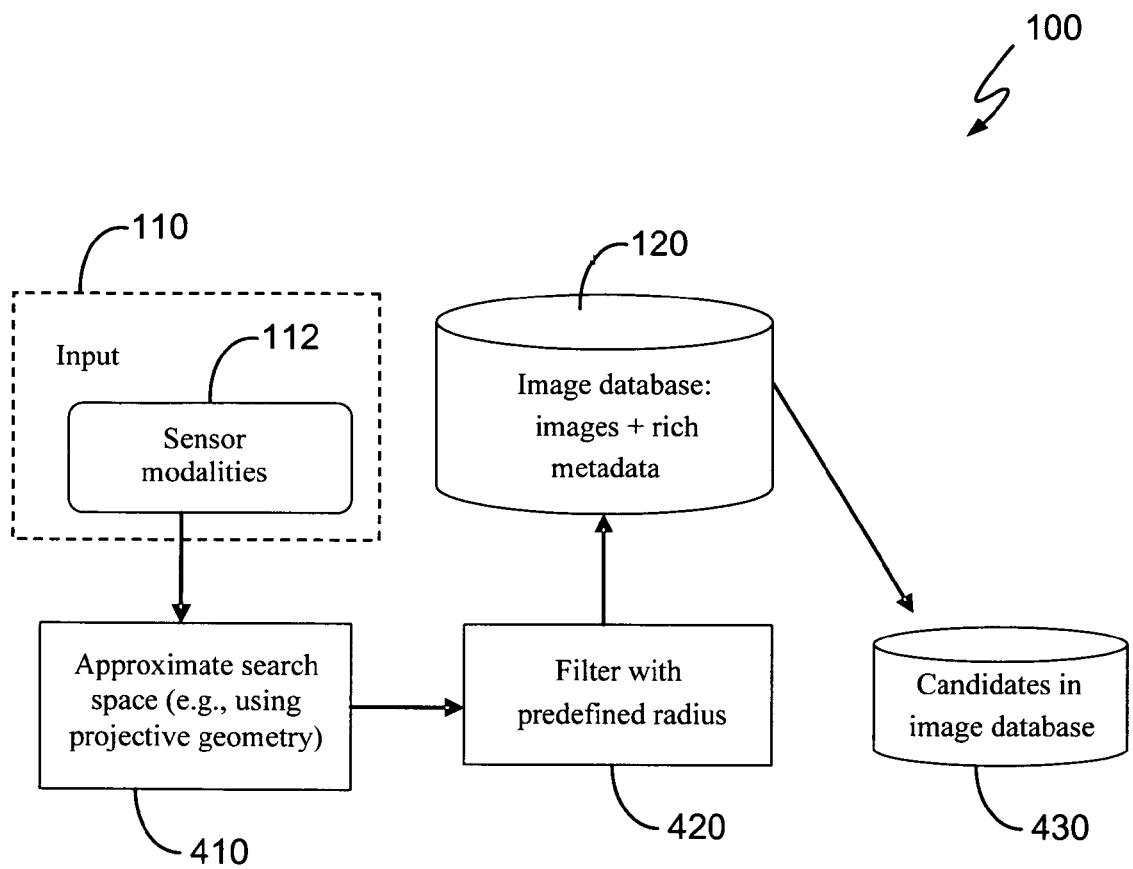
FIG. 4 is a schematic representation of the constraint-based image recognition system flow of FIG. 1 according to an embodiment of the invention.

As shown in FIG. 3, sensor modalities 305 may occur as an initial step in image recognition algorithm 200. Sensor modalities 305 may act as an extra layer of refinement in the image identification process that can reduce the size of the image search space. This is illustrated in FIG. 4, which is a schematic representation of constraint-based image recognition system flow 100 according to an embodiment of the invention. FIG. 4 shows input 110 including sensor modalities 112 (which are the equivalent of sensor modalities 305 in FIG. 3). Sensor modalities 112 are used (e.g., as depicted in FIG. 3 and as describe above) to approximate 410 the image search space using a filtering scheme 420 (e.g., as shown and described above). This yields a group 430 of candidates in image database 120 that must be searched, where group 430 may be significantly smaller than the number of images in image database 120.

Figure 5:
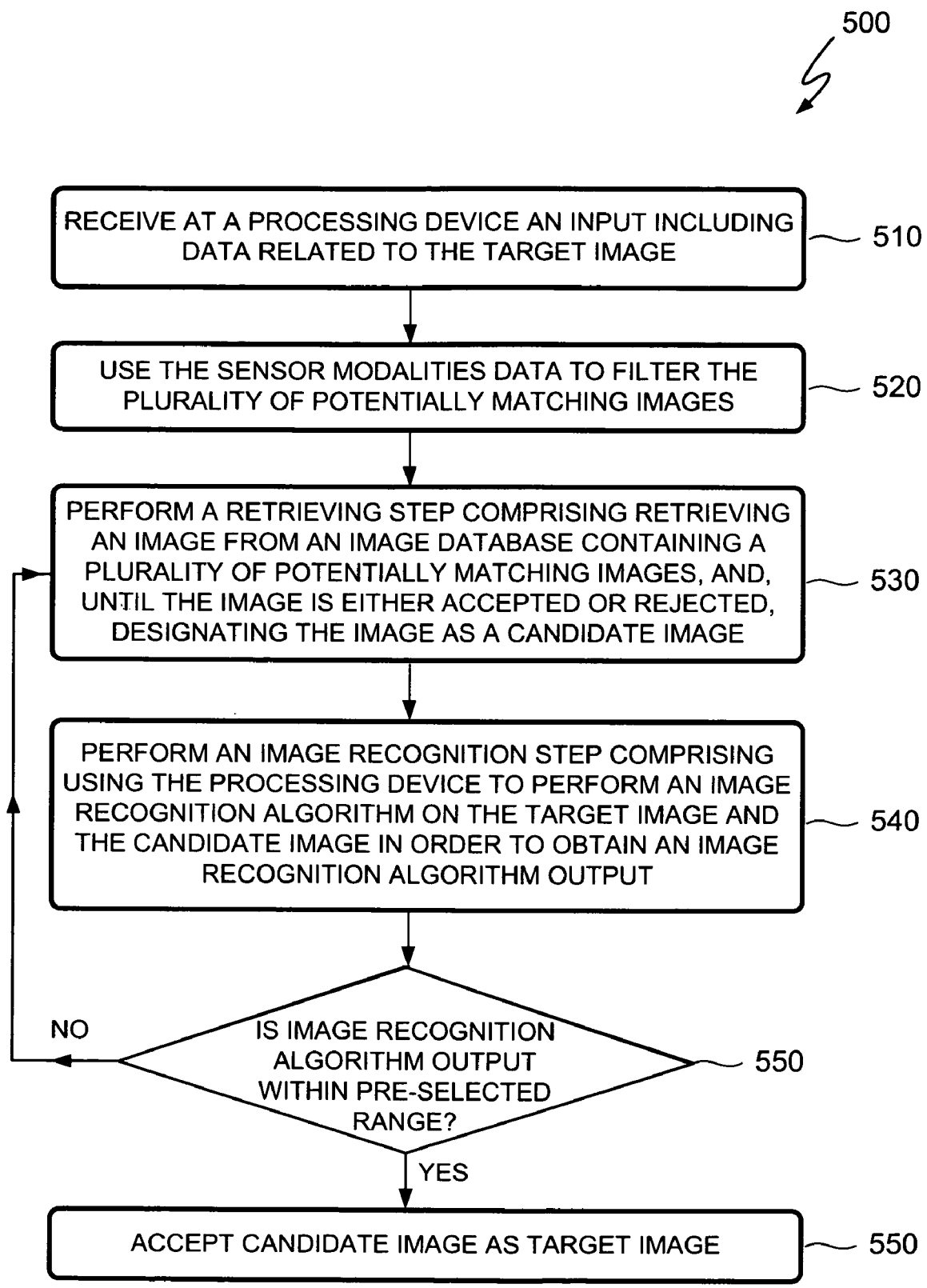
FIG. 5 is a flowchart illustrating a method of identifying a target image according to an embodiment of the invention.

FIG. 5 is a flowchart illustrating a method 500 of identifying a target image according to an embodiment of the invention. As discussed above, the target image may be a user-generated image captured by a mobile computing device. As an example, users can optionally specify a region of interest instead of submitting the whole image as a query. The image visual content itself, together with text, speech keywords, and sensor modalities such as GPS, accelerometer, gyroscope, and digital compass information are transferred to an image match service. Depending on computational/bandwidth resources this image match service can reside either on the mobile computing device or run as a backend service connected wirelessly to the mobile computing device.

A step 510 of method 500 is to receive at a processing device an input including data related to the target image. As an example, the input can be similar to input 110 that is first shown in FIG. 1. In one embodiment, step 510 comprises receiving at least one of visual content data, sensor modalities data, and audio content data. In the same or another embodiment, step 510 comprises receiving the input from a portable electronic device such as a MID, a cellular telephone, or the like. In one embodiment, step 510 comprises receiving sensor modalities data that include data from at least one of a GPS, an accelerometer or other suitable motion sensor, a gyroscope, and a compass. In one embodiment the accelerometer may be a 3D accelerometer.

As an example, the processing device can be located at a server or other backend service, at a MID or other portable computing device, or at a similar location. The processing device may be part of a computing platform running software algorithms performing, among other tasks, image/video processing tasks such as object detection and recognition, user interface, and image/video rendering. As an example, such algorithms can be similar to image recognition algorithm 200. A video display may be used to render the results of the processing, optionally combining it with the actual image/video data and additional information provided by the image database.

The computing platform may further include an image sensor connected to a pixel processor capable of capturing and processing still images and video. The pixel processor can be programmed to possess functionality ranging from the performance of simple operations such as histogram calculations, 2D filtering, and arithmetic operations on arrays of pixels to the performance of more complex tasks such as object detection, 3D filtering, and the like. A host central processing unit (CPU) coordinates the overall platform operation and may execute a portion of the software algorithms. Improved power and performance may be obtained by including in the platform multiple accelerators in addition to the pixel processor; these may include video codecs, image/video stabilization blocks, and other image processing blocks.

An interconnect fabric may connect the host CPU and the image processing blocks to the main memory, display, and storage. In addition to this, the interconnect fabric may allow individual image processing blocks to connect directly to each other for performing certain tasks. In this case unused platform components could be put in a low-power state to improve the power/performance characteristics of the platform. All platform components may have access to a platform clock in order to synchronize sensing, computing, and actuating actions. The platform may include hardware support for direct component-to-component communication mechanisms based on interrupts, mailboxes, and other methods.

A step 520 of method 500 is to use the sensor modalities data to filter the plurality of potentially matching images. As an example, and as discussed above, this (optional) filtering may reduce the image search space and may increase the accuracy of the image recognition algorithm output as well as the speed with which it is obtained.

A step 530 of method 500 is to perform a retrieving step comprising retrieving an image from an image database containing a plurality of potentially matching images, and, until the image is either accepted or rejected, designating the image as a candidate image. As an example, the image database can be similar to image database 120 (see FIG. 1) or to a subset of image database 120 such as group 430 (see FIG. 4).

A step 540 of method 500 is to perform an image recognition step comprising using the processing device to perform an image recognition algorithm on the target image and the candidate image in order to obtain an image recognition algorithm output. As an example, the image recognition algorithm can be similar to image recognition algorithm 200 that is first shown in FIG. 2. Accordingly, in one embodiment, step 540 comprises using the processing device to perform a keypoints-based comparison, a region-based color comparison, and a visual symbol comparison. In particular embodiments, performing the keypoints-based comparison comprises performing a pairwise comparison of at least two keypoints feature vectors, performing the region-based color comparison comprises performing an EMD comparison of at least two color feature vectors, and performing the visual symbol comparison comprises performing a cosine comparison.

A step 550 of method 500 is to perform a comparison step in which if the image recognition algorithm output is within a pre-selected range (thus indicating a desired quality of match) the candidate image is accepted as the target image and if the image recognition algorithm output is not within the pre-selected range (indicating the desired quality of match was not achieved) the candidate image is rejected and the retrieving step, the image recognition step, and the comparison step are repeated.

Figure 6:
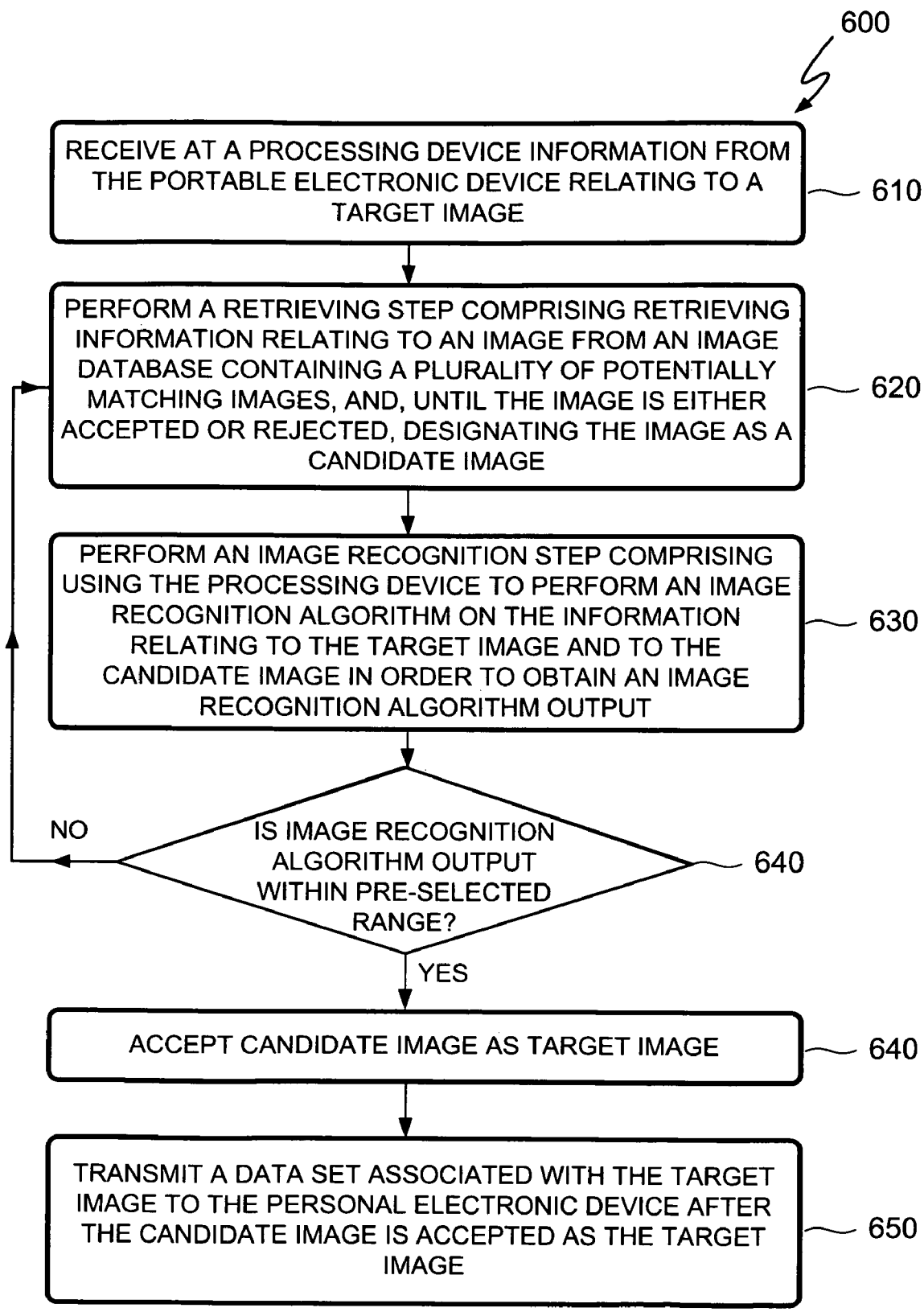
FIG. 6 is a flowchart illustrating a method of selecting data for transmission to a portable electronic device according to an embodiment of the invention.

FIG. 6 is a flowchart illustrating a method 600 of selecting data for transmission to a portable electronic device according to an embodiment of the invention.

A step 610 of method 600 is to receive at a processing device information from the portable electronic device relating to a target image. In one embodiment, step 610 comprises receiving at least one of visual content data, sensor modalities data, and audio content data. In one embodiment, step 610 comprises receiving sensor modalities data that includes data from at least one of a GPS, a 3D (or other) accelerometer or other motion sensor, a gyroscope, and a compass. In one embodiment, method 600 further comprises using the sensor modalities data to filter the plurality of potentially matching images.

A step 620 of method 600 is to perform a retrieving step comprising retrieving information relating to an image from an image database containing a plurality of potentially matching images, and, until the image is either accepted or rejected, designating the image as a candidate image. As an example, the retrieved information can comprise color features or other visual content data or the like.

A step 630 of method 600 is to perform an image recognition step comprising using the processing device to perform an image recognition algorithm on the information relating to the target image and to the candidate image in order to obtain an image recognition algorithm output. In one embodiment, step 630 comprises using the processing device to perform a keypoints-based comparison, a region-based color comparison, and a visual symbol comparison. In various embodiments, performing the keypoints-based comparison comprises performing a pairwise comparison of at least two keypoints feature vectors, performing the region-based color comparison comprises performing an EMD comparison of at least two color feature vectors, and performing the visual symbol comparison comprises performing a cosine comparison.

A step 640 of method 600 is to perform a comparison step in which if the image recognition algorithm output is within a pre-selected range (thus indicating a desired quality of match) the candidate image is accepted as the target image and if the image recognition algorithm output is not within the pre-selected range (indicating the desired quality of match was not achieved) the candidate image is rejected and the retrieving step, the image recognition step, and the comparison step are repeated.

A step 650 of method 600 is to transmit a data set associated with the target image to the personal electronic device after the candidate image is accepted as the target image.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the image recognition algorithm and the related methods discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of identifying a target image, the method comprising:
    performing an image recognition algorithm comprising:
        a keypoints-based comparison;
        a visual symbol comparison comprising a comparison of a character or a symbol that appears on or in connection with an object in the target image, wherein the visual symbol comparison comprises a cosine comparison;
        an audio content analysis comprising an analysis of an audible description of the target image;
        a region-based color comparison; and
        a sensor modalities analysis.

2. The method of claim 1 wherein:
    the keypoints-based comparison comprises a pairwise comparison of at least two keypoints feature vectors.

3. The method of claim 1 wherein:
    the region-based color comparison comprises an earth mover's distance (EMD) comparison of at least two color feature vectors.

4. A method of identifying a target image, the method comprising:
    receiving an input at a processing device, the input including data related to the target image;
    performing a retrieving step, the retrieving step comprising retrieving an image from an image database, the image database containing a plurality of potentially matching images, and, until the image is either accepted or rejected, designating the image as a candidate image;
    performing an image recognition step, the image recognition step comprising using the processing device to perform an image recognition algorithm on the target image and the candidate image in order to obtain an image recognition algorithm output; and performing a comparison step, the comparison step comprising:

if the image recognition algorithm output is within a pre-selected range, accepting the candidate image as the target image and matching the target image with information relevant to the target image; and if the image recognition algorithm output is not within the pre-selected range, rejecting the candidate image and repeating the retrieving step, the image recognition step, and the comparison step, wherein using the processing device to perform the image recognition algorithm comprises using the processing device to perform at least one of a keypoints-based comparison, a region-based color comparison, and a visual symbol comparison, and wherein performing the visual symbol comparison comprises performing a cosine comparison.

5. The method of claim 4 wherein:

performing the keypoints-based comparison comprises performing a pairwise comparison of at least two keypoints feature vectors.

6. The method of claim 4 wherein:

performing the region-based color comparison comprises performing an earth mover's distance (EMD) comparison of at least two color feature vectors.

7. The method of claim 4 wherein:

receiving the input at the processing device comprises receiving sensor modalities data; and the sensor modalities data include data from at least one of a location system, a motion sensor, a gyroscope, and a compass.

8. The method of claim 7 further comprising:

using the sensor modalities data to filter the plurality of potentially matching images.

9. The method of claim 4 wherein:

receiving the input at the processing device comprises receiving at least one of visual content data, sensor modalities data, and audio content data.

10. The method of claim 4 wherein:

receiving the input at the processing device comprises receiving the input from a portable electronic device.

\* \* \* \* \*